United States Patent [19]

Hong

[11] Patent Number: 5,708,474
[45] Date of Patent: Jan. 13, 1998

[54] METHOD AND APPARATUS FOR INTERPOLATING SCANNING LINE OF TV SIGNAL IN TV

[75] Inventor: Sung Hoon Hong, Songpa-Ku, Rep. of Korea

[73] Assignee: Goldstar Co., Ltd., Seoul, Rep. of Korea

[21] Appl. No.: 997,592

[22] Filed: Dec. 28, 1992

[30] Foreign Application Priority Data

Dec. 27, 1991 [KR] Rep. of Korea ............... 24555/1991

[51] Int. Cl.[6] ........................... H04N 7/01; H04N 11/02
[52] U.S. Cl. .................................. 348/448; 348/441
[58] Field of Search ...................... 358/140, 11, 133, 358/138, 136, 160, 105, 141, 12; 348/441, 447, 448, 449, 450, 451, 452; H04N 7/01, 5/20, 11/40

[56] References Cited

U.S. PATENT DOCUMENTS

| | | | |
|---|---|---|---|
| 4,768,092 | 8/1988 | Ishikawa | 358/140 |
| 4,831,435 | 5/1989 | Song et al. | 358/140 |
| 4,937,667 | 6/1990 | Choquet et al. | 358/140 |
| 4,985,764 | 1/1991 | Sato | 358/140 |
| 5,019,903 | 5/1991 | Dougall et al. | 358/140 |
| 5,093,721 | 3/1992 | Robii | 358/140 |

FOREIGN PATENT DOCUMENTS

| | | | |
|---|---|---|---|
| A 0316231 | 5/1989 | European Pat. Off. | H04N 5/14 |
| 0301558 | 4/1990 | European Pat. Off. | H04N 5/44 |
| A 0396229 | 7/1990 | European Pat. Off. | H04N 5/44 |

*Primary Examiner*—Michael Lee
*Attorney, Agent, or Firm*—David E. Lovejoy

[57] ABSTRACT

A method and an apparatus for interpolating a scanning line of a TV signal in a TV, wherein a diagonal component of a video signal of the TV signal is considered and there can be prevented a line structure, a line flicker and a vertical resolution insufficiency due to shortage in the number of the scanning lines. The apparatus of the invention comprises a scanning line interpolator for obtaining vertical, horizontal and diagonal variations of a received video signal of the TV signal and considering a weight with respect to a signal of the smallest variation, so as to obtain an interpolation signal, a first time compressor for compressing the time of an output signal from the scanning line interpolator by 2 to 1, a second time compressor for compressing the time of the received video signal by 2 to 1, and a switch for selecting an output signal from the second time compressor with respect to a position of the original signal and selecting an output signal from the first time compressor with respect to a position to be interpolated.

10 Claims, 8 Drawing Sheets

METHOD AND APPARATUS FOR INTERPOLATING SCANNING LINE OF TV SIGNAL IN TV

BACKGROUND OF THE INVENTION

1. Field of the Invention

The present invention relates in general to interpolating a scanning line of a television signal of the interlaced scanning type in a television (TV), and more particularly to a method and an apparatus for interpolating a scanning line of a TV signal in a TV, wherein a diagonal component of a video signal of the TV signal is considered and there can be prevented a line structure, a line flicker and a vertical resolution insufficiency due to shortage in the number of the scanning lines.

2. Description of the Prior Art

Generally, in a TV of the interlaced scanning type, a line structure, a line flicker, a vertical resolution insufficiency and etc. are generated as picture quality degradation elements due to the interlaced scanning. For this reason, for the purpose of solutions to these problems, there has conventionally been employed a method of scanning an interpolation scanning line between scanning lines of the original video signal to double the number of the scanning lines.

The conventional method of doubling the number if the scanning lines includes an intra-field interpolation method of performing the interpolation by averaging the upper and lower scanning lines with respect to a scanning line to be interpolated and an inter-field interpolation method of interpolating a scanning line of the previous field as the interpolation scanning line.

FIG. 1 is a block diagram of a conventional inter-field interpolator for a TV and FIG. 2 is a view illustrating the inter-field and intra-field interpolation methods. In FIG. 1, the conventional inter-field interpolator comprises a one field memory 1 for delaying a received luminance signal Yin of a television signal by one field, a first time compressor 2A for compressing the time base of an output signal from the one field memory 1 by 2 to 1, a second time compressor 2B for compressing the time base of the luminance signal Yin by 2 to 1, and a switch SW1 for selectively outputting one of output signals from the first and second time compressors 2A and 2B. In operation, the time base of the luminance signal Yin delayed by the one field memory 1 or the time base of the luminance signal Yin of the previous field is compressed by 2 to 1 by the first time compressor 2A and the time base of the original luminance signal Yin or the time base of the luminance signal Yin of the current field is compressed by 2 to 1 by the second time compressor 2B. As a result, the switch SW1 selects the output signal from the first time compressor 2A with respect to the scanning line to be interpolated and selects the output signal from the second time compressor 2B with respect to the original scanning line.

Namely, in FIG. 2, the inter-field interpolation is performed by substituting the scanning line i to be interpolated in the current field n by a scanning line c of the previous field n−1.

Referring to FIG. 3, there is shown a block diagram of a conventional intra-field interpolator for a TV. Herein, the scanning line i to be interpolated in the current field n is substituted by averaging the upper and lower scanning lines a and b about the scanning line i in the same field n. As shown in this drawing, the conventional intra-field interpolator comprises a one line memory 3 for delaying a received luminance signal Yin of a television signal by one line, an adder 4 for adding an output signal from the one line memory 3 to the luminance signal Yin, a ½ amplifier ½ AMP for amplifying an output signal from the adder 4 by a ½ level, a first time base compressor 5A for compressing the time of an output signal from the ½ amplifier ½ AMP by 2 to 1, a second time base compressor 5B for compressing the time of the luminance signal Yin by 2 to 1, and a switch SW2 for selectively outputting one of output signals from the first and second time compressors 5A and 5B. In operation, the luminance signal Yin delayed by the one line memory 3 is added to the original luminance signal Yin by the adder 4 and then amplified by the ½ amplifier ½ AMP. The time base of the output signal from the ½ amplifier ½ AMP is compressed by 2 to 1 by the first time base compressor 5A and the time of the original luminance signal Yin is compressed by 2 to 1 by the second time compressor 5B. As a result, the switch SW2 selects the output signal from the first time compressor 5A with respect to the scanning line to be interpolated and selects the output signal from the second time compressor 5B with respect to the original scanning line.

However, the inter-field interpolation method has a disadvantage, in that a considerable picture quality degradation such as shimmering or step edges appears at a moving video and the intra-field interpolation method has a disadvantage, in that a reduction in the vertical resolution is caused because the interpolation signal is generated by averaging the two scanning lines.

A motion adaptive interpolation method has been proposed for improvement in the above-mentioned interpolation methods. In the motion adaptive interpolation method, a motion level of the video is discriminated. The intra-field interpolation method is employed in an area of the video in which the motion is present. Also, the inter-field interpolation method is employed in an area of the video in which the motion is not present.

Referring to FIG. 4, there is shown a block diagram of a conventional motion adaptive interpolator for a TV. As shown in this drawing, the conventional motion adaptive interpolator comprises first and second time compressors 9A and 9B, an inter-field interpolator 6, an intra-field interpolator 7, a motion detection unit 8 and first and second switches SW3 and SW4. In operation, a received luminance signal Yin of a television signal is applied to the first time compressor 9A, the inter-field interpolator 6, the intra-field interpolator 7 and the motion detection unit 8. The first switch SW3 selects one of output signals from the inter-field interpolator 6 and the intra-field interpolator 7 in response to an output signal from the motion detection unit 8. Also, the second switch SW4 selects one of output signals from the first and second time compressors 9A and 9B to output the luminance signal to which the scanning line interpolation has been applied.

In the conventional motion adaptive interpolator, the intra-field interpolator 7 performs the interpolation by averaging the upper and lower scanning lines with respect to the scanning line to be interpolated and outputs the resultant interpolation signal, as mentioned above. Also, the inter-field interpolator 6 outputs the scanning line signal of the previous field as the interpolation signal as mentioned above. At this time, the motion detection unit 8 detects a motion of the inputted luminance signal Yin being present in a motion detection area and outputs a control signal in accordance with the motion detection. In response to the control signal from the motion detection unit 8, the switch SW3 performs its switching operation.

That is, when a motion of the inputted luminance signal Yin is present in the motion detection area, the switch SW3 selects the interpolation signal from the intra-field interpolator 7 in response to the control signal from the motion detection unit 8 based on the motion detection. On the contrary, when the motion of the inputted luminance signal Yin is beyond the motion detection area, the switch SW3 selects the interpolation signal from the inter-field interpolator 6 in response to the control signal from the motion detection unit 8 based on the detection of no motion.

The time base of the interpolation signal outputted from the switch SW3 is compressed by 2 to 1 by the second time compressor 9B and the time base of the inputted luminance signal Yin is compressed by 2 to 1 by the first time compressor 9A. Then, the switch SW4, in turn, selects the original signal from the first time compressor 9A and the interpolation signal from the second time compressor 9B. As a result, the switch SW4 outputs the luminance signal to which the scanning line interpolation has been applied.

In other words, the original signal from the first time compressor 9A is applied through the switch SW4 to the original scanning line positions (a and b in FIG. 2) and the interpolation signal from the second time compressor 9B is applied through the switch SW4 to a scanning line position (i in FIG. 2) to be interpolated. Herein, the switch SW4 is switched at a speed of double a line frequency of the inputted luminance signal Yin.

However, the conventional scanning line interpolation method utilizing the motion adaptive scanning line interpolator is desirable in that a relative excellent performance is exhibited when the motion of the inputted signal is accurately discriminated, but has a disadvantage in that the accuracy in the motion discrimination is low with respect to a composite video signal in which chrominance and luminance signals are mixed. For this reason, in the case where a consistency is not maintained in time and space in the scanning line interpolation based on the motion detection, there may be caused a considerable picture quality degradation such as shimmering, step edges, a resolution insufficiency, a video blur resulting from the motion and etc.. Also, the interpolation is performed, with respect to a pixel to be interpolated, by using only a pixel of the same position in the previous or next field, with no consideration for diagonal and horizontal components of the inputted signal. Furthermore, at least two line memories are used for the motion detection, resulting in an increase in the cost. In result, in the conventional scanning line interpolation method utilizing the motion adaptive scanning line interpolator, the scanning line interpolation cannot accurately be performed when the vide with the motion is varied horizontally or diagonally and a proper countermove cannot be taken with respect to the motion of the video in the time axis.

SUMMARY OF THE INVENTION

Therefore, the present invention has been made in view of the above problems, and it is an object of the present invention to provide a method and an apparatus for interpolating a scanning line of a TV signal in a TV, wherein there can be prevented a line structure, a line flicker and a vertical resolution insufficiency due to shortage in the number of the scanning lines.

It is another object of the present invention to provide a method and an apparatus for interpolating a scanning line of a TV signal in a TV, wherein a two dimensional region interpolation signal can be generated in consideration of diagonal and vertical components, so as to prevent a picture quality degradation.

It is another object of the present invention to provide a method and an apparatus for interpolating a scanning line of a TV signal in a TV, wherein a three dimensional region interpolation signal can be generated in consideration of diagonal, vertical and horizontal components, so as to enable a sharp interpolation.

It is still another object of the present invention to provide a method and an apparatus for interpolating a scanning line of a TV signal in a TV, wherein a three dimensional region interpolation signal can be generated by obtaining an interpolation signal in consideration of vertical and horizontal components and an interpolation signal in consideration of diagonal components and adding the interpolation signals on the basis of a weight, so as to enable a reduction in an error rate instead of the sharp interpolation.

In accordance with one aspect of the present invention, there is provided a method of interpolating a scanning line of a TV signal in a TV, comprising the steps of: discriminating horizontal, vertical and diagonal variations of a received video signal of the TV signal, multiplying a vertical component signal and a signal of the smallest variation in accordance with the discriminated result by a weight and a complement to the weight, respectively, adding the multiplied signals and obtaining the added signal as an interpolation signal; compressing the time base of the interpolation signal and the received video signal, respectively; and scanning selectively and in turn the time-compressed original received video signal and the time-compressed interpolation signal in the unit of a line; whereby the number of the scanning lines of the video signal can be doubled.

In accordance with another aspect of the present invention, there is provided an apparatus for interpolating a scanning line of a TV signal in a TV, comprising: scanning line interpolating means for obtaining vertical, horizontal and diagonal variations of a received video signal of the TV signal and considering a weight with respect to a signal of the smallest variation, so as to obtain an interpolation signal; first time compressing means for compressing the time base of an output signal from said scanning line interpolating means by 2 to 1; second time compressing means for compressing the time base of the received video signal by 2 to 1; and switching means for selecting an output signal from said second time compressing means with respect to a position of the original received video signal and selecting an output signal from said first time compressing means with respect to a position to be interpolated.

In accordance with a first embodiment of the present invention, the scanning line interpolating means is a two dimensional region scanning line interpolator and includes variation detecting means for obtaining a first diagonal sum signal, a second diagonal sum signal, a vertical sum signal, a first diagonal difference signal, a second diagonal difference signal and a vertical difference signal of the received video signal of the TV signal; control signal generating means for comparing an absolute value of the first diagonal difference signal with an absolute value of the vertical difference signal, comparing an absolute value of the second diagonal difference signal with the absolute value of the vertical difference signal and generating control signals in accordance with the compared results; smallest difference signal selecting means for selecting the smallest difference one of the average of the first diagonal sum signal, the average of the second diagonal sum signal, the average of the averages of the first and second diagonal sum signals and the average of the vertical sum signal in response to the control signals from said control signal generating means; an IIR filter for generating a weight with respect to a signal of the smallest difference in response to the control signals from said control signal generating means; and interpolation signal output means for multiplying the average of the smallest difference sum signal from said smallest difference signal selecting means by a complement to the weight from said IIR filter, multiplying the average of the vertical sum signal by the weight form said IIR filter, adding the multiplied values and outputting the added value as the interpolation signal.

In accordance with second and third embodiments of the present invention, the scanning line interpolating means is provided as a three dimensional region scanning line interpolator of a construction different from that of the two dimensional region scanning line interpolator.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 10:
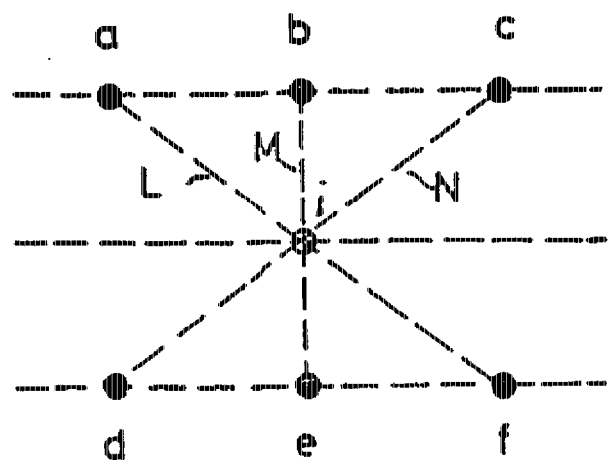
FIG. 10 is a view illustrating a two dimensional region scanning line interpolation method in accordance with the first embodiment of the present invention.

Referring to FIG. 10, there is illustrated a two dimensional region scanning line interpolation method in accordance with a first embodiment of the present invention. It is first assumed herein that a pixel to be interpolated is i, a+f=L, c+d=M, b+e=H, L is a first diagonal sum signal, N is a second diagonal sum signal and M is a vertical sum signal.

There are discriminated variations of a received video signal of a TV signal in horizontal, vertical and diagonal directions. In accordance with the discriminated result, a vertical component signal and a signal of the smallest variation are multiplied by a weight and a complement to the weight, respectively. The multiplied signals are added and the added signal is selected as an interpolation signal for doubling the number of scanning lines of a received video signal.

The step of obtaining the interpolation signal includes a step of obtaining the first diagonal sum signal (a+f), the second diagonal sum signal (c+d), the vertical sum signal (b+e), a first diagonal difference signal, a second diagonal difference signal and a vertical difference signal with respect to the pixel i to be interpolated, a step of comparing the first and second diagonal difference signals and the vertical difference signal to one another and generating control signals in accordance with the compared results, a step of selecting the smallest difference one of the average of the first diagonal sum signal, the average of the second diagonal sum signal, the average of the averages of the first and second diagonal sum signals and the average of the vertical sum signal in response to the control signals generated based on the comparison of the difference signals, a step of determining the weight in response to the control signals generated based on the comparison of the difference signals, a step of multiplying the average of the smallest difference sum signal by the complement to the weight, multiplying the average of the vertical sum signal by the weight, adding the multiplied values and selecting the added value as a value of the pixel i to be interpolated, and a step of compressing the time base of the received video signal and the selected interpolation value, respectively, and outputting selectively and in turn the time-compressed signals in the unit of a line.

Figure 11:
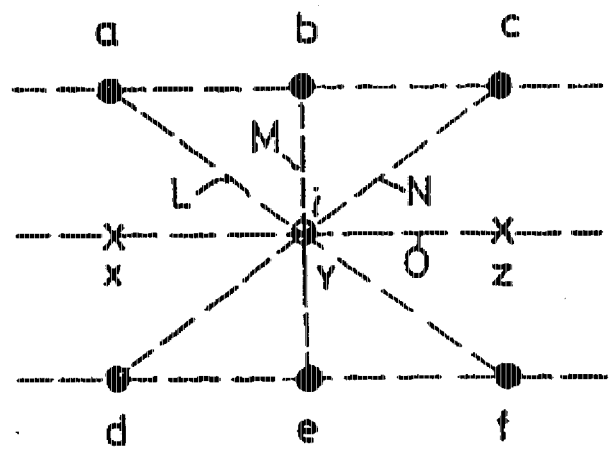
FIG. 11 is a view illustrating three dimensional region scanning line interpolation methods in accordance with the second and third embodiments of the present invention.

Referring to FIG. 11, there are illustrated three dimensional region scanning line interpolation methods in accordance with second and third embodiments of the present invention. In accordance with the second embodiment of the present invention, the interpolation signal is determined by considering the first diagonal sum signal, the second diagonal sum signal, the vertical sum signal, the first diagonal difference signal, the second diagonal difference signal and the vertical difference signal, a horizontal sum signal obtained by adding an interpolation pixel y of the previous field to the left and right pixels x and z with respect to the interpolation pixel y and a horizontal difference signal resulting from a difference between the left and right pixels x and z. Namely, a weight is determined and the average of the smallest difference component is selected in consideration of vertical, horizontal and diagonal variations of the video signal on a three dimensional region. The average of the smallest difference component is multiplied by a complement to the weight and the average of a vertical component is multiplied by the weight. As a result, the sum of the two multiplied components is selected as a value of the pixel to be interpolated.

The step of obtaining the interpolation signal includes a step of obtaining the first diagonal sum signal (a+f), the second diagonal sum signal (c+d), the vertical sum signal (b+e), the first diagonal difference signal, the second diagonal difference signal and the vertical difference signal with respect to the interpolation pixel i, a step of obtaining the horizontal sum signal by adding the interpolation pixel y of the previous field to the left and right pixels x and z with respect to the interpolation pixel y and obtaining a horizontal difference signal resulting from a difference between the left and right pixels x and z, a step of comparing the horizontal difference signal with the vertical difference signal to select a smaller one of the two signals, a step of comparing the first diagonal difference signal with the second diagonal difference signal to select a smaller one of the two signals, comparing the smaller one of the horizontal and vertical difference signals with the smaller one of the first and second diagonal difference signals and generating control signals in accordance with the compared results, a step of determining the weight in response to the control signal generated based on the comparison of the smaller values and a control signal generated based on the comparison of the vertical and horizontal difference signals, a step of obtaining a smallest difference sum signal select control signal in response to the control signal generated based on the comparison of the smaller values, the control signal generated based on the comparison of the first and second diagonal difference signals and the control signal generated based on the comparison of the vertical and horizontal difference signals, a step of selecting the smallest difference one of the average of the first diagonal sum signal, the average of the second diagonal sum signal, the average of the horizontal sum signal and the average of the vertical sum signal in response to the smallest difference sum signal select control signal and the control signal generated based on the comparison of the smaller values, a step of multiplying the average of the smallest difference sum signal by the complement to the weight, multiplying the average of the vertical sum signal by the weight, adding the multiplied signals and selecting the added value as a value of the pixel i to be interpolated, and a step of compressing the time base of the received video signal and the selected interpolation value, respectively, and outputting selectively and in turn the time-compressed signals in the unit of line.

In accordance with the third embodiment of the present invention, a vertical/horizontal interpolation signal is obtained by considering a weight with respect to vertical and horizontal components and a diagonal interpolation signal is obtained by considering a weight with respect to a diagonal component. A weight is determined according to the smallest difference component. The final interpolation signal is obtained by applying the weight determined according to the smallest difference component to the vertical/horizontal interpolation signal and the diagonal interpolation signal.

The step of obtaining the interpolation signal includes a step of obtaining the first diagonal sum signal (a+f), the second diagonal sum signal (c+d), the vertical sum signal (b+e), the first diagonal difference signal, the second diagonal difference signal and the vertical difference signal with respect to the interpolation pixel i, a step of obtaining the horizontal sum signal by adding the interpolation pixel y of the previous field to the left and right pixels x and z with respect to the interpolation pixel y and obtaining a horizontal difference signal resulting from a difference between the left and right pixels x and z, a step of comparing the horizontal difference signal with the vertical difference signal to select a smaller one of the two signals, a step of determining a weight in accordance with the comparison of the horizontal and vertical difference signals, multiplying the average of the horizontal sum signal by a complement of the weight, multiplying the average of the vertical sum signal by the weight and obtaining the sum of the multiplied signals as the vertical/horizontal interpolation signal, a step of comparing the first diagonal difference signal with the second diagonal difference signal to select a smaller one of the two signals, comparing the smaller one of the horizontal and vertical difference signals with the smaller one of the first and second diagonal difference signals and generating control signals in accordance with the compared results, a step of determining a weight in response to the control signal generated based on the comparison of the first and second diagonal difference signals, multiplying the average of the second diagonal sum signal by a complement to the weight, multiplying the average of the first diagonal sum signal by the weight and obtaining the sum of the multiplied signals as the diagonal interpolation signal, a step f determining a weight in response to the control signal generated based on the comparison of the smaller values, multiplying the vertical/horizontal interpolation signal by a complement to the weight, multiplying the diagonal interpolation signal by the weight and obtaining the sum of the multiplied signals as the final interpolation signal, and a step of compressing the time base of the received video signal and the final interpolation signal, respectively, and outputting selectively and in turn the time-compressed signals in the unit of line.

Figure 1:
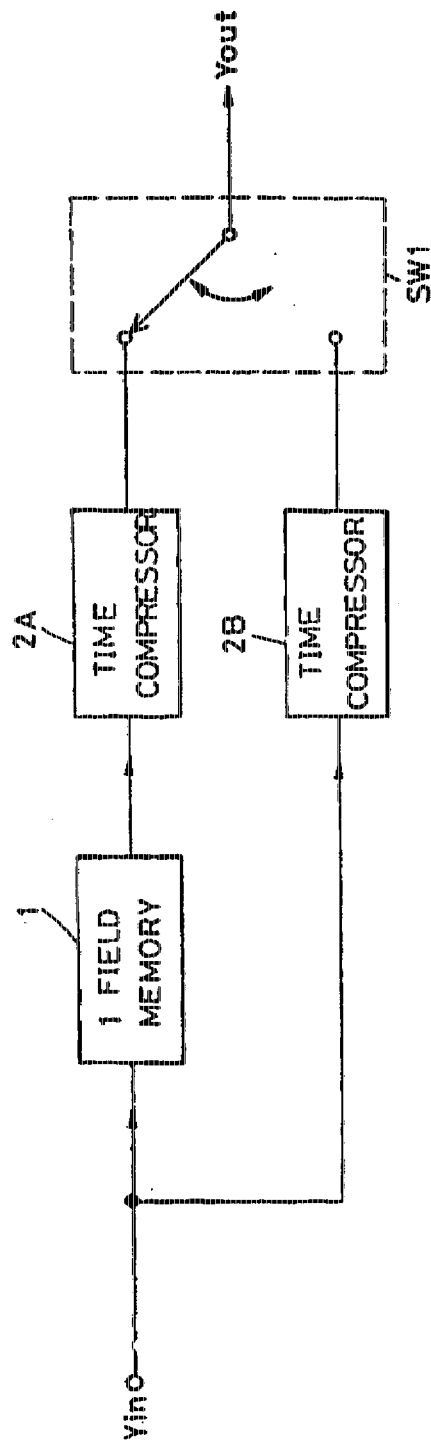
FIG. 1 is a block diagram of a conventional inter-field interpolator for a TV.
Figure 2:
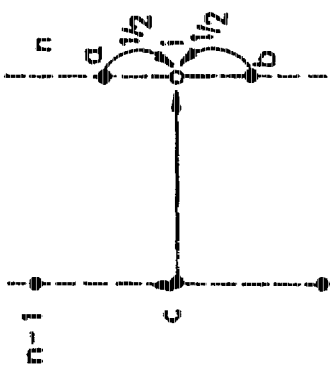
FIG. 2 is a view illustrating conventional inter-field and intra-filed interpolation methods.
Figure 3:
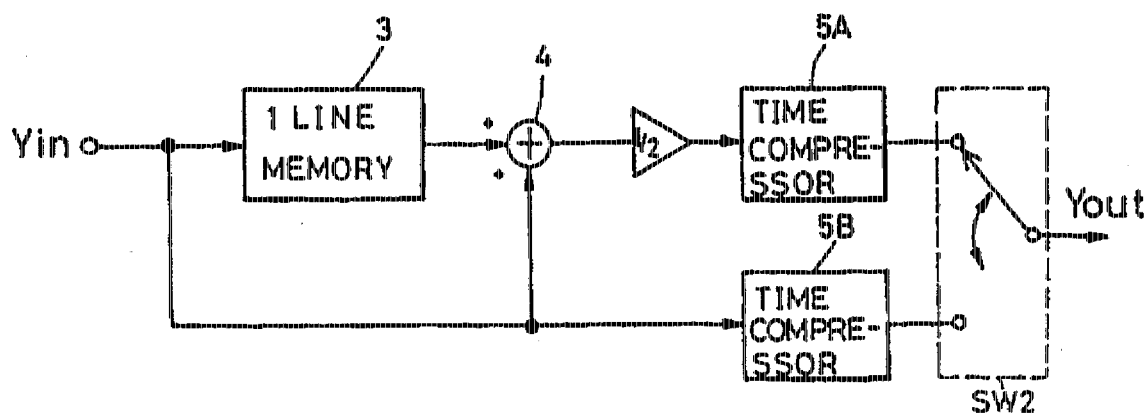
FIG. 3 is a block diagram of a conventional intra-field interpolator for a TV.
Figure 4:
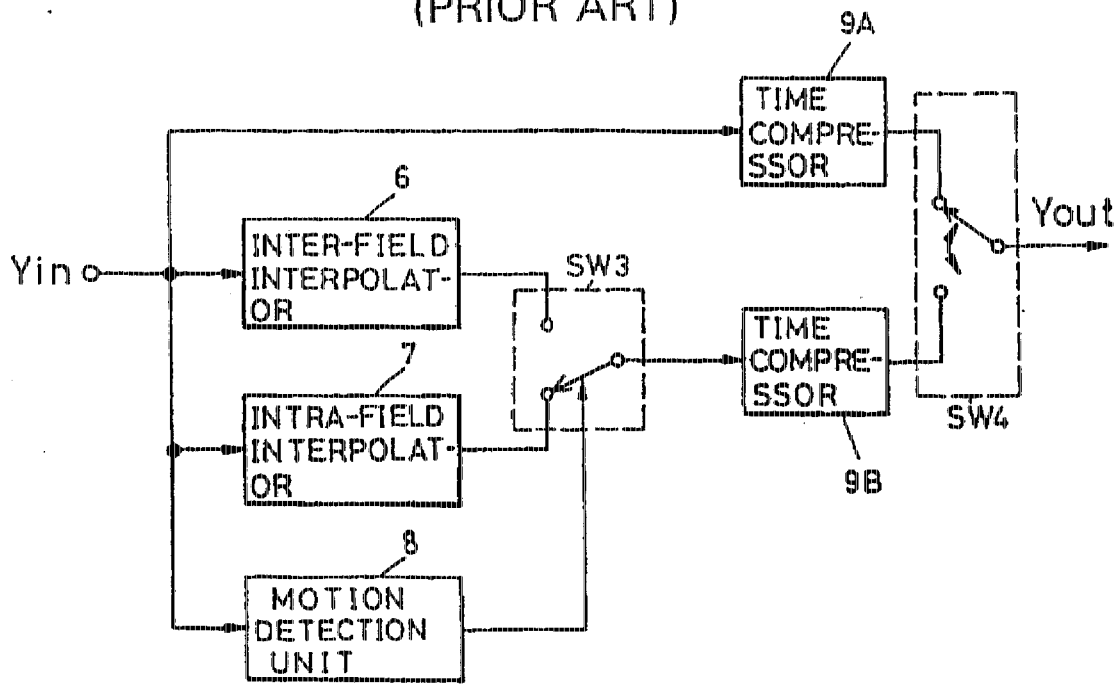
FIG. 4 is a block diagram of a conventional motion adaptive interpolator for a TV.
Figure 5:
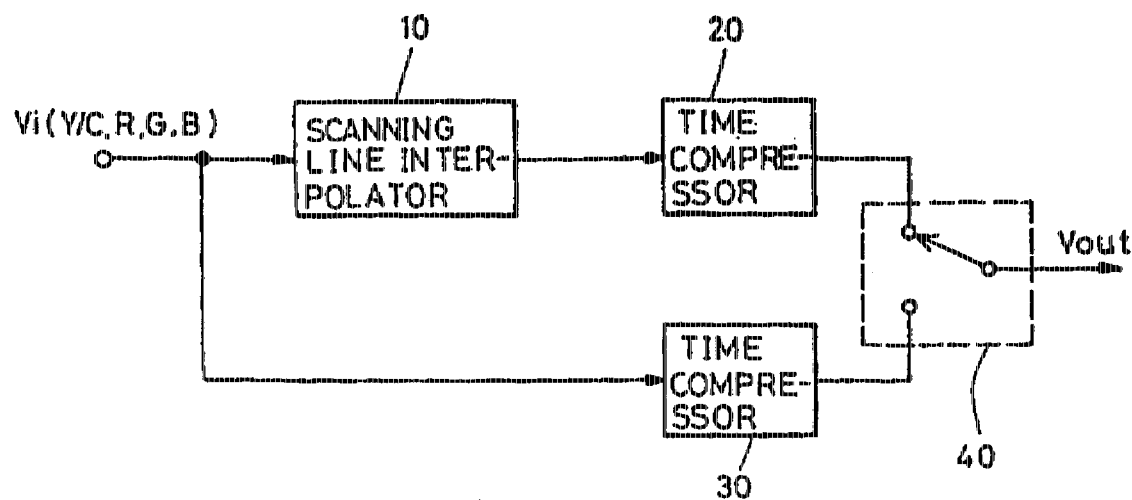
FIG. 5 is a block diagram of an apparatus for interpolating a scanning line of a TV signal in a TV in accordance with the present invention.

Referring to FIG. 5, there is shown a block diagram of an apparatus for interpolating a scanning line of a TV signal in a TV in accordance with the present invention. As shown in this drawing, the scanning line interpolating apparatus of the present invention comprises a scanning line interpolator 10 for obtaining an interpolation signal by obtaining vertical, horizontal and diagonal variations of a received video signal of the TV signal and considering a weight from an IIR filter with respect to a signal of the smallest variation, a first time compressor 20 for compressing the time base of an output signal from the scanning line interpolator 10 by 2 to 1, a second time compressor 30 for compressing the time base of the received video signal by 2 to 1, and a switch 40 for selecting an output signal from the second time compressor 30 with respect to a position of the original received video signal and selecting an output signal from the first time compressor 20 with respect to a position to be interpolated.

Figure 6:
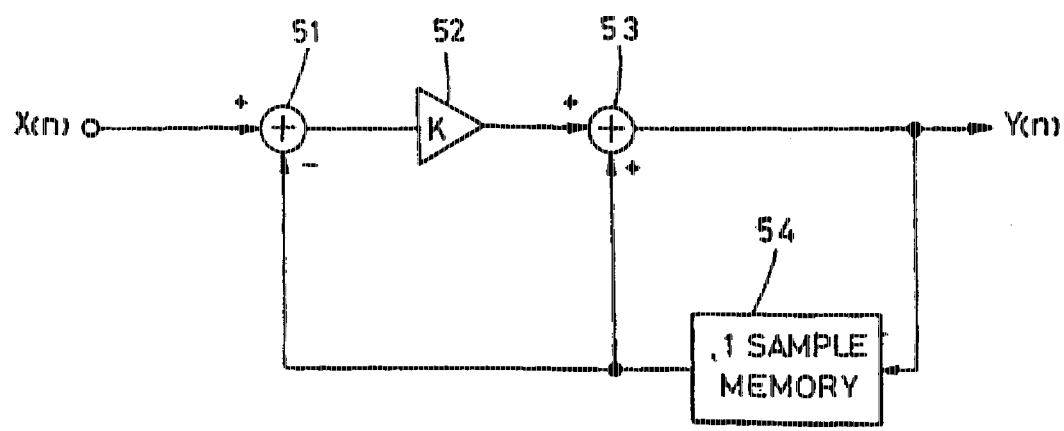
FIG. 6 is a block diagram of an IIR filter which is applied to the present invention.

Referring to FIG. 6, there is shown a block diagram of the IIR filter which is applied to the present invention. As shown in this figure, the IIR filter includes a subtracter 51 for obtaining a difference between an input signal Xn and an output signal from the IIR filter delayed by one sample, a K amplifier 52 for amplifying an output signal from the subtracter 51 by a predetermined weight, an adder 53 for adding an output signal from the K amplifier 52 to the output signal from the IIR filter delayed by one sample and outputting the added signal as a weight signal, and a one sample memory 54 for delaying an output signal from the adder 53 by one sample and feeding back the one sample-delayed signal to the subtracter 51 and the adder 53.

Figure 7:
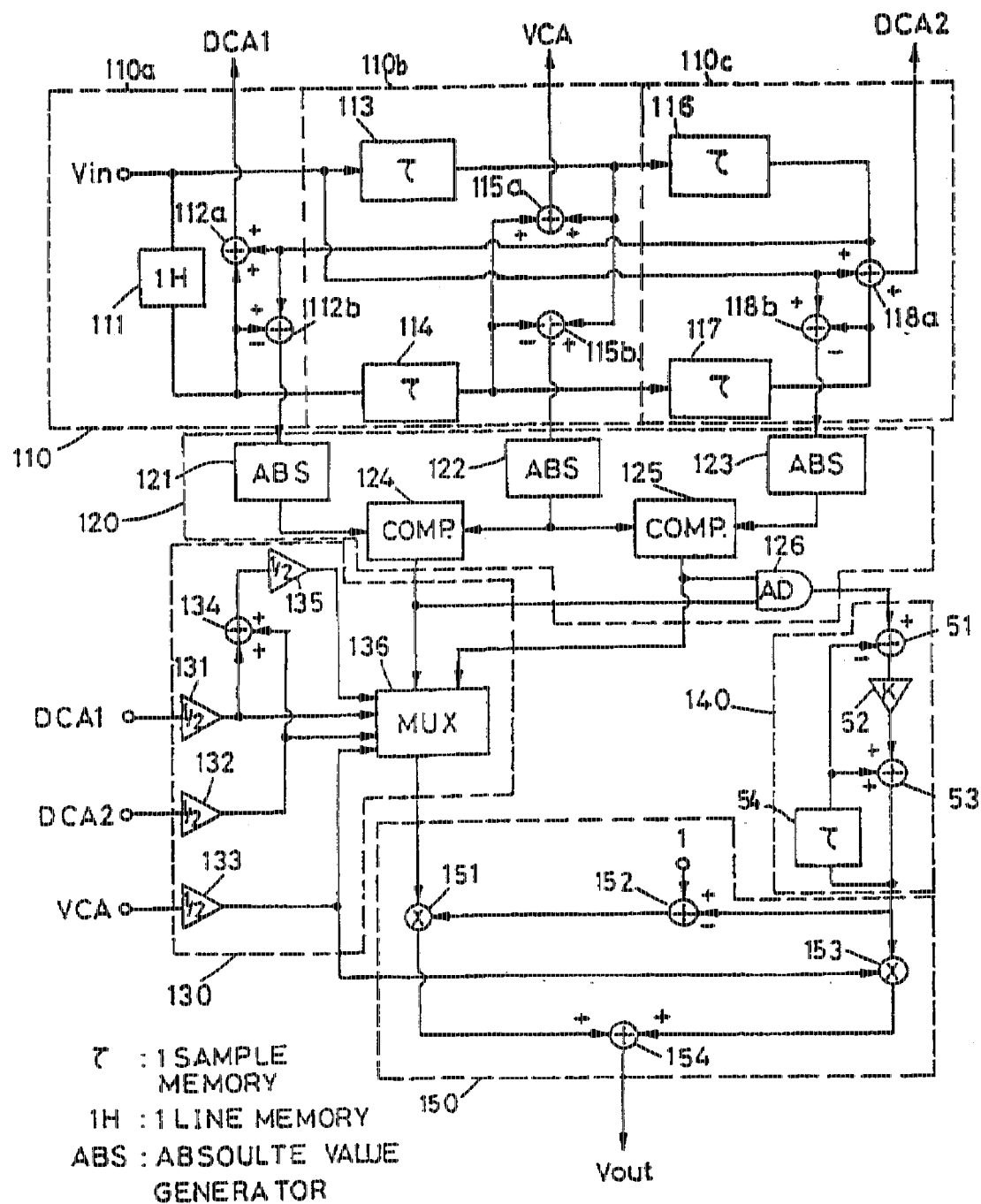
FIG. 7 is a block digram of a two dimensional region scanning line interpolator in the apparatus in FIG. 5 in accordance with a first embodiment of the present invention.

Referring to FIG. 7, there is shown a block diagram of the scanning line interpolator 10 in the apparatus in FIG. 5 in accordance with the first embodiment of the present invention. Herein, the scanning line interpolator 10 is embodied as a two dimensional region scanning line interpolator 100 utilizing the above-mentioned IIR filter. As shown in this figure, the two dimensional region scanning line interpolator 100 includes a variation detecting circuit 110 for obtaining a first diagonal sum signal DCA1, a second diagonal sum signal DCA2, a vertical sum signal VCA, a first diagonal difference signal, a second diagonal difference signal and a vertical difference signal of the received video signal of the TV signal, a control signal generating circuit 120 for comparing an absolute value of the first diagonal difference signal with an absolute value of the vertical difference signal, comparing an absolute value of the second diagonal difference signal with the absolute value of the vertical difference signal and generating control signals in accordance with the compared results, a smallest difference signal selecting circuit 130 for selecting the smallest difference one of the average of the first diagonal sum signal DCA1, the average of the second diagonal sum signal DCA2, the average of the averages of the first and second diagonal sum signals DCA1 and DCA2 and the average of the vertical sum signal VCA in response to the control signals from the control signal generating circuit 120, an IIR filter 140 for generating a weight with respect to a signal of the smallest difference in response to the control signals from the control signal generating circuit 120, and an interpolation signal output circuit 150 for multiplying the average of the smallest difference sum signal from the smallest difference signal selecting circuit 130 by a complement to the weight from the IIR filter 140, multiplying the average of the vertical sum signal by the weight from the IIR filter 140, adding the multiplied values and outputting the added value as the interpolation signal Vout.

The variation detecting circuit 110 includes a first diagonal component detector 110a for delaying the inputted video signal Vin by two samples and by one line, adding the two-sample-delayed video signal Vin to the one line-delayed video signal Vin to obtain the first diagonal sum signal DCA1 and subtracting the two-sample-delayed video signal Vin from the one line-delayed video signal Vin to obtain the first diagonal difference signal, a vertical component detector 110b for delaying the inputted video signal Vin by one sample and by one line, delaying the one line-delayed video signal Vin by one sample, adding the one sample-delayed video signal Vin to the one line-delayed and then one sample-delayed video signal Vin to obtain the vertical sum signal VCA and subtracting the one sample-delayed video signal Vin from the one line-delayed and then one sample-delayed video signal Vin to obtain the vertical difference signal, and a second diagonal component detector 110c for delaying the inputted video signal Vin by one line and then by two samples, adding the one line-delayed and then two-sample-delayed video signal Vin to the inputted video signal Vin to obtain the second diagonal sum signal DAC2 and subtracting the one line-delayed and then two-sample-delayed video signal Vin from the inputted video signal Vin to obtain the second diagonal difference signal.

Figure 8:
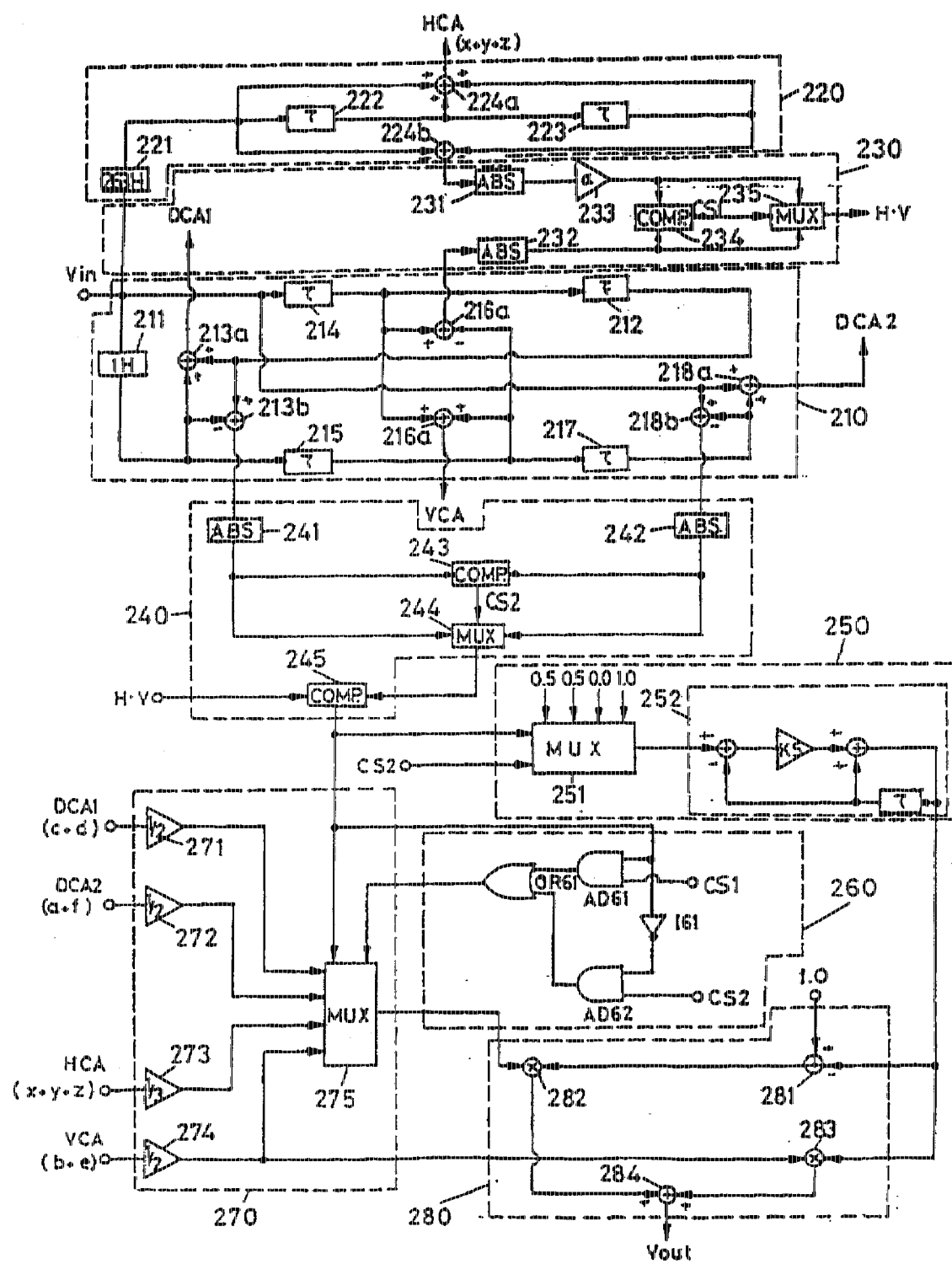
FIG. 8 is a block diagram of a three dimensional region scanning line interpolator in the apparatus in FIG. 5 in accordance with a second embodiment of the present invention.

Referring to FIG. 8, there is shown a block diagram of the scanning line interpolator 10 in the apparatus in FIG. 5 in accordance with the second embodiment of the present invention. Herein, the scanning line interpolator 10 is embodied as a three dimensional region scanning line interpolator 200 utilizing the above-mentioned IIR filter. As shown in this drawing, the three dimensional region scanning line interpolator 200 includes a variation detecting circuit 210 for obtaining a first diagonal sum signal DCA1, a second diagonal sum signal DCA2, a vertical sum signal VCA, a first diagonal difference signal, a second diagonal difference signal and a vertical difference signal of the received video signal of the TV signal, a horizontal variation detecting circuit 220 for obtaining a horizontal sum signal HCA (x+y+z) by adding an interpolation pixel y of the previous field to the left and right pixels x and z with respect to the interpolation pixel y and obtaining a horizontal difference signal resulting from a difference between the left and right pixels x and z, a vertical/horizontal difference selecting circuit 230 for comparing an absolute value of the horizontal difference signal from the horizontal variation detecting circuit 220 with an absolute value of the vertical difference signal from the variation detecting circuit 210 to select a smaller one of the two signals, a first control signal generating circuit 240 for comparing an absolute value of the first diagonal difference signal with an absolute value of the second diagonal difference signal to select a smaller one of the two signals, comparing an output signal from the vertical/horizontal difference selecting circuit 230 with the smaller one of the first and second diagonal difference signals and generating control signals in accordance with the compared results, a weight generating circuit 250 for determining a weight in response to the control signal generated based on the comparison of the smaller values in the first control signal generating circuit 240 and a control signal generated based on the comparison of the vertical and horizontal difference signals in the vertical/horizontal difference selecting circuit 230, a second control signal generating circuit 260 for generating a smallest difference sum signal select control signal in response to the control signal generated based on the comparison of the smaller values in the first control signal generating circuit 240, the control signal generated based on the comparison of the first and second diagonal difference signals in the first control signal generating circuit 240 and the control signal generated based on the comparison of the vertical and horizontal difference signals in the vertical/horizontal difference selecting circuit 230, a smallest difference signal selecting circuit 270 for selecting the smallest difference one of the average of the first diagonal sum signal DCA1, the average of the second diagonal sum signal DCA2, the average of the horizontal sum signal HCA and the average of the vertical sum signal VCA in response to the control signals from the first and second control signal generating circuits 240 and 260, and an interpolation signal output circuit 280 for multiplying the average of the smallest difference sum signal from the smallest difference signal selecting circuit 270 by a complement to the weight from the weight generating circuit 250, multiplying the average of the vertical sum signal VCA by the weight from the weight generating circuit 250, adding the multiplied signals and outputting the added value as the interpolation signal Vout.

Figure 9:
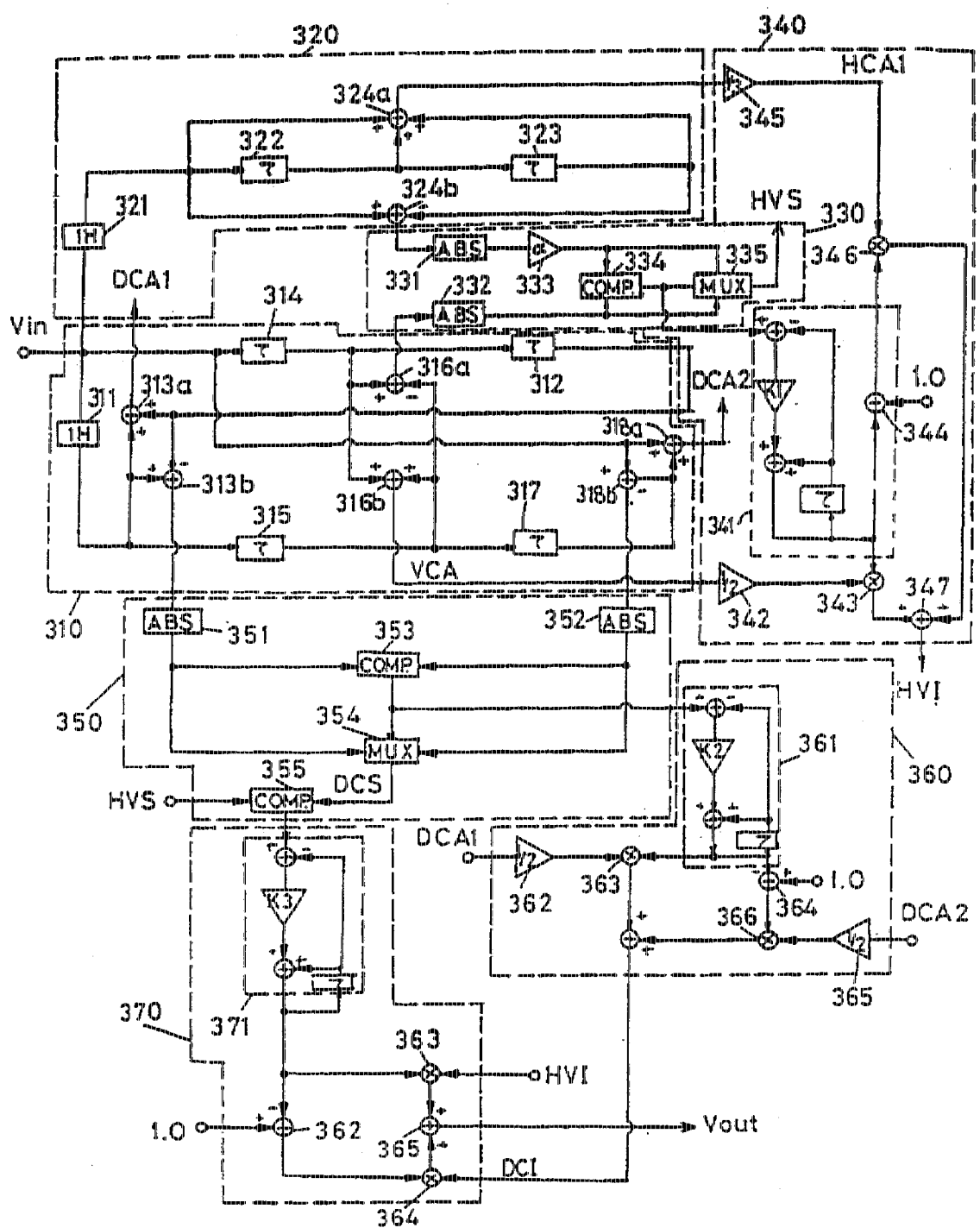
FIG. 9 is a block diagram of a three dimensional region scanning line interpolator in the apparatus in FIG. 5 in accordance with a third embodiment of the present invention.

Referring to FIG. 9, there is shown a block diagram of the scanning line interpolator 10 in the apparatus in FIG. 5 in accordance with the third embodiment of the present invention. Herein, the scanning line interpolator 10 is embodied as a three dimensional region scanning line interpolator 300 utilizing the above-mentioned IIR filter. As shown in this drawing, the three dimensional region scanning line interpolator 300 includes a variation detecting circuit 310 for obtaining a first diagonal sum signal DCA1, a second diagonal sum signal DCA2, a vertical sum signal VCA, a first diagonal difference signal, a second diagonal difference signal and a vertical difference signal of the received video signal of the TV signal, a horizontal variation detecting circuit 320 for obtaining a horizontal sum signal HCA by adding an interpolation pixel y of the previous field to the left and right pixels x and z with respect to the interpolation pixel y and obtaining a horizontal difference signal resulting from a difference between the left and right pixels x and z, a vertical/horizontal difference selecting circuit 330 for comparing the horizontal difference signal from the horizontal variation detecting circuit 320 with the vertical difference signal from the variation detecting circuit 310 to select a smaller one of the two signals, a vertical/horizontal interpolation signal generating circuit 340 for determining a weight in accordance with the comparison of the horizontal and vertical difference signals, multiplying the average of the horizontal sum signal by a complement to the determined weight, multiplying the average of the vertical sum signal by the determined weight, adding the multiplied signals and outputting the added signal as a vertical/horizontal interpolation signal, a control signal generating circuit 350 for comparing the first diagonal difference signal with the second diagonal difference signal to select a smaller one of the two signals, comparing an output signal from the vertical/horizontal difference selecting circuit 330 with the smaller one of the first and second diagonal difference signals and generating control signals in accordance with the compared results, a diagonal interpolation signal generating circuit 360 for determining a weight in response to the control signal generated based on the comparison of the first and second diagonal difference signals in the control signal generating circuit 350, multiplying the average of the second diagonal sum signal by a complement to the determined weight, multiplying the average of the first diagonal sum signal by the determined weight, adding the multiplied signals and outputting the added signal as a diagonal interpolation signal, and an interpolation signal output circuit 370 for determining a weight in response to the control signal generated based on the comparison of the smaller values in the control signal generating circuit 350, multiplying the vertical/horizontal interpolation signal from the vertical/horizontal interpolation signal generating circuit 340 by a complement to the determined weight, multiplying the diagonal interpolation signal from the diagonal interpolation signal generating circuit 350 by the determined weight, adding the multiplied signals and outputting the added value as the final interpolation signal Vout.

The operation of the scanning line interpolating apparatus with the above-mentioned construction in accordance with the present invention will hereinafter be described in detail.

First briefly stated with reference to FIG. 5, the video signal Vi or luminance and chrominance signals separated from the received TV signal is applied to the scanning line interpolator 10. The scanning line interpolator 10 extracts the interpolation signal from the received video signal Vi and outputs it to the first time compressor 20. The video signal Vi is also applied to the second time compressor 30. The first and second time compressors 20 and 30 perform the time compression with respect to the inputted signals. The switch 40 selects the output signal from the second time compressor 30 with respect to the original received video signal position and selects the output signal from the first time compressor 20 with respect to the position to be interpolated. At this time, a switching clock of the switch 40 is $f_H/2$ ($f_H$: about 53.5 μsec in a NTSC system).

FIG. 10 illustrates the two dimensional region scanning line interpolation method in accordance with the first embodiment of the present invention. Herein, the interpolation is performed with respect to the sample to be interpolated, by using the vertical component sum signal M and the smallest difference one of the vertical component sum signal M and the diagonal component sum signals L and N.

Figure 12:
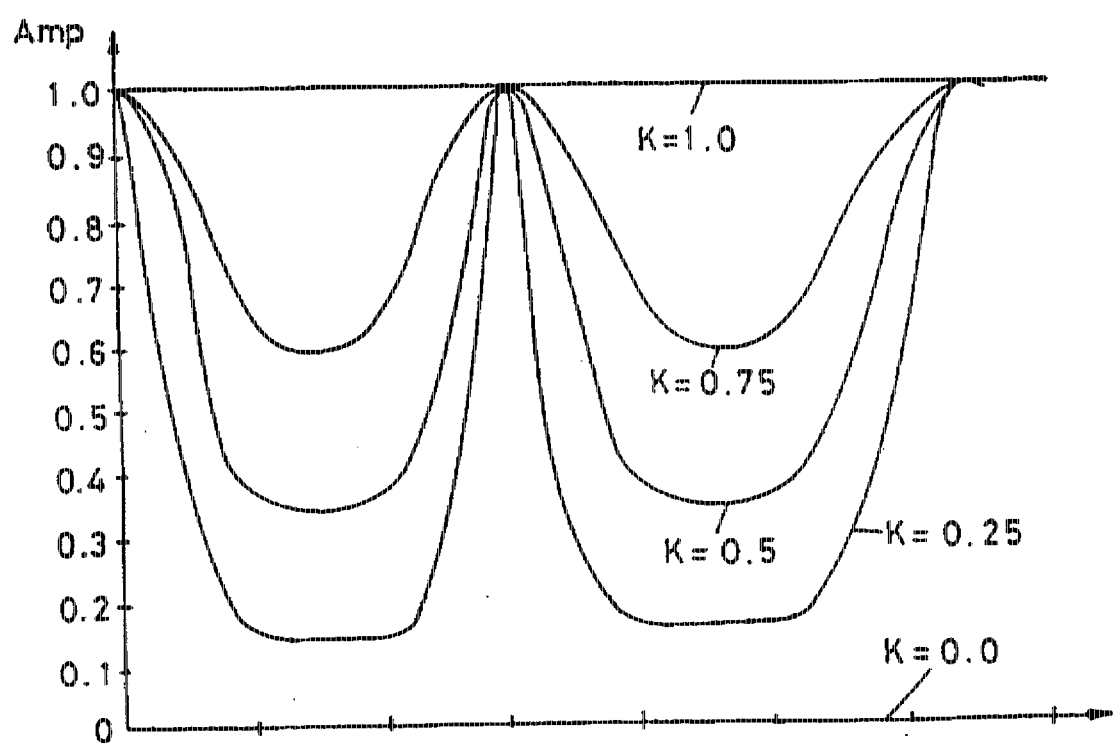
FIG. 12 is a waveform diagram illustrating a frequency response characteristic of the IIR filter in FIG. 6.

FIG. 12 is a waveform diagram illustrating a frequency response characteristic of the IIR filter in FIG. 6, which maintains a consistency of the weight to prevent a considerable picture quality degradation due to a discrimination error. Assuming that the input of the IIR filter is X(n), the output thereof can be expressed by the following equation:

$$Y(n)=K\ X(n)+(1-K)\ Y(n-1) \quad (1)$$

The frequency response of the IIR filter can be expressed by the following equation:

$$H(e^{jw})=K/1-(1-K)e^{jw} \quad (2)$$

From the above equation, it can be seen that the output signal is sensitive to the input signal as the K value becomes large.

As a result, when the smallest difference one of the vertical component sum signal M and the diagonal component sum signals L and N is M, "1" is applied to the input X(n) of the IIR filter. When the smallest difference one of the vertical component sum signal M and the diagonal component sum signals L and N is L or N, "0" is applied to the input X(n) of the IIR filter. At this time, the output Y(n) of the IIR filter is obtained as in the above equation (1). In result, the interpolation sample value can be obtained as follows:

$$Y(n)/2+[1-Y(n)]\times(\text{the average of the smallest difference component}) \quad (3)$$

For reference, the difference signal components can be expressed as follows:

$$L=ABS[a-f],\ M=ABS[b-e],\ N=ABS[c-d]$$

where, "ABS" represents an absolute value.

FIG. 7 shows the two dimensional region scanning line interpolator in the apparatus in FIG. 5, which performs the two dimensional region scanning line interpolation method in accordance with the first embodiment of the present invention. In operation, upon application of the video signal Vin to the variation detecting circuit 110, one sample delays 113 and 116 in sequence delay the inputted video signal Vin by one sample and a one line delay 111 delays the inputted video signal Vin by one line. An adder 112a adds the two-sample-delayed video signal Vin from the one sample delay 116 to the one line-delayed video signal Vin from the one line delay 111 and outputs the added signal as the first diagonal sum signal DCA1. A subtracter 112b subtracts the two-sample-delayed video signal Vin from the one sample delay 116 from the one line-delayed video signal Vin from the one line delay 111 and outputs the subtracted signal as the first diagonal difference signal. Also, the output signal from the one line delay 111 is in sequence delayed by each of one sample by one sample delays 114 and 117. An adder 118a adds the one line-delayed and then two-sample-delayed video signal Vin from the one sample delay 117 to the inputted video signal Vin and outputs the added signal as the second diagonal sum signal DAC2. A subtracter 118b subtracts the one line-delayed and then two-sample-delayed video signal Vin from the one sample delay 117 from the inputted video signal Vin and outputs the subtracted signal as the second diagonal difference signal. Also, the output signal from the one sample delay 113 and the output signal from the one sample delay 114 are applied to an adder 115a and a subtracter 115b, respectively. As a result of the addition and subtraction of the two signals, the adder 115a outputs the vertical sum signal VCA and the subtracter 115b outputs the vertical difference signal.

The first and second diagonal difference signals and the vertical difference signal detected in the variation detecting circuit 110 are applied to the control signal generating circuit 120. In the control signal generating circuit 120, the absolute values of the first and second diagonal difference signals and the absolute value of the vertical difference signal are obtained by absolute value generators 121, 122 and 123, respectively. A comparator 124 compares the first diagonal difference signal with the vertical difference signal and a comparator 125 compares the second diagonal difference signal with the vertical difference signal. The output signals from the comparators 124 and 125 are applied as the select control signals to the smallest difference signal selecting circuit 130 and, also, as the weight control signal to the IIR filter 140 through their combination in an AND gate 126.

At this time, the comparators 124 and 125 output "1" when the smallest difference component is the vertical component, while "0" is output when the smallest difference component is the diagonal component, respectively.

In response to the output signals from the comparators 124 and 125 in the control signal generating circuit 120, a multiplexer 136 in the smallest difference signal selecting circuit 130 selects the smallest difference one of the average of the first diagonal sum signal DCA1, the average of the second diagonal sum signal DCA2, the average of the averages of the first and second diagonal sum signals DCA1 and DCA2 and the average of the vertical sum signal VCA. Namely, there is selected the sum signal having the smallest difference in the corresponding direction.

The smallest difference sum signal outputted from the multiplexer 136 in the smallest difference signal selecting circuit 130 is applied to a multiplier 151 in the interpolation signal output circuit 150, which multiplies the inputted smallest difference sum signal by the complement to the weight from the IIR filter 140. Also, the vertical sum signal VCA is applied to a multiplier 153 in the interpolation signal output circuit 150, which multiplies the inputted vertical sum signal VCA by the weight from the IIR filter 140. Then, the output signals from the multipliers 151 and 153 are added by an adder 154, which then outputs the added signal as the interpolation signal.

Herein, the value K of the K amplifier 52 in the IIR filter 140 may be one of 0.25, 0.5 and 0.75. Since the output signal is sensitive to the input signal as the K value becomes large, the larger K value enables a sharp interpolation, but a probability of the resultant interpolation error is high.

FIG. 11 illustrates the three dimensional region scanning line interpolation methods in accordance with the second and third embodiments of the present invention. Herein, the horizontal component [O=absolute(x−z)] on the time axis is considered in addition to the two dimensional region scanning line interpolation method in FIG. 10. For the embodiment of such a three dimensional region scanning line interpolation method, the present invention proposes the two circuits as shown in FIGS. 8 and 9.

FIG. 8 shows the three dimensional region scanning line interpolator in the apparatus in FIG. 5, which performs the three dimensional region scanning line interpolation method in accordance with the second embodiment of the present invention. First, the operation of the three dimensional region scanning line interpolator in accordance with the second embodiment of the present invention can be described briefly as follows:

1) The smallest difference one of L, M, N and O is obtained.

2) A IIR filter 252 inputs "0.5" when the smallest difference component is the diagonal component L or N, "1" when the smallest difference component is the vertical component M and "0" when the smallest difference component is the horizontal component O, respectively.

3) The interpolation sample value can be obtained as follows:

Y(n)×[(b+e)/2]+[1−Y(n)]×(the average of the smallest difference component).

In operation, upon receiving the video signal of the TV signal, the variation detecting circuit 210 detects the first diagonal sum signal DCA1, the second diagonal sum signal DCA2, the vertical sum signal VCA, the first diagonal difference signal, the second diagonal difference signal and the vertical difference signal of the received video signal.

Also, the horizontal variation detecting circuit 220 detects the horizontal sum signal HCA and the horizontal difference signal of the received video signal.

In the vertical/horizontal difference selecting circuit 230, the absolute values of the vertical and horizontal difference signals from the variation detecting circuit 210 and the horizontal variation detecting circuit 220 are applied to a comparator 234 and a multiplexer 235, respectively. In response to the control signal based on the comparison of the comparator 234, the multiplexer 235 selects a smaller one of the two inputted signals and outputs the selected signal to a comparator 245 in the first control signal generating circuit 240. Also in the first control signal generating circuit 240, the absolute values of the first and second diagonal difference signals from the variation detecting circuit 210 are applied to a comparator 243 and a multiplexer 244, respectively. In response to the control signal based on the comparison of the comparator 243, the multiplexer 244 selects a smaller one of the two inputted signals and outputs the selected signal to the comparator 245. As a result, the comparator 245 compares the smaller one of the first and second diagonal difference signals with the smaller one of the vertical and horizontal difference signals and then outputs the resultant signal as the smallest difference signal select control signal and the weight select control signal.

In the second control signal generating circuit 260, the control signal is generated on the basis of the output signal from the comparator 245 in the first control signal generating circuit 240, the control signal CS1 based on the comparison of the vertical and horizontal difference signals and the control signal CS2 based on the comparison of the first and second diagonal difference signals and then applied as the select control signal to a multiplexer 275 in the smallest difference signal selecting circuit 270. The average of the first diagonal sum signal DCA1, the average of the second diagonal sum signal DCA2, the average of the horizontal sum signal HCA and the average of the vertical sum signal VCA are obtained by ½ amplifiers 271–274, respectively, and then loaded into the multiplexer 275. Then, in response to the select control signal, the multiplexer 275 selects the smallest difference one of the loaded signals.

At this time, in the weight generating circuit 250, a multiplexer 251 inputs the output signals from the comparators 234 and 245 as the select control signals. In response to the select control signals, the multiplexer 251 outputs "1.0" to the IIR filter 252 when the smallest difference component is the vertical component and "0.5" to the IIR filter 252 when the smallest difference component is the horizontal component. Herein, the K value of the K amplifier 52 in the IIR filter 252 is 0.5–1.0.

The average of the smallest difference sum signal outputted from the smallest difference signal selecting circuit 270 is applied to a multiplier 282 in the interpolation signal output circuit 280, which multiplies the inputted smallest difference sum signal average by the complement to the weight from the IIR filter 252, which is obtained by an adder 281 in the interpolation signal output circuit 280. Also, the average of the vertical sum signal VCA is applied to a multiplier 283 in the interpolation signal output circuit 280, which multiplies the inputted vertical sum signal VCA average by the weight from the IIR filter 252. Then, the output signals from the multipliers 282 and 283 are added by an adder 284 in the interpolation signal output circuit 280, which then outputs the added signal as the interpolation signal Vout.

FIG. 9 shows the three dimensional region scanning line interpolator in the apparatus in FIG. 5, which performs the three dimensional region scanning line interpolation method in accordance with the third embodiment of the present invention. First, the operation of the three dimensional region scanning line interpolator in accordance with the third embodiment of the present invention can be described briefly as follows:

1) The smaller one of L and N is obtained.
2) The smaller one of M and O is obtained.
3) An IIR filter inputs "1" when the smaller component is L in the above item 1 and "O" when the smaller component is N in the above item 1, and the output Y1 thereof is calculated on the basis of the input thereof.
4) The IIR filter inputs "1" when the smaller component is M in the above item 2 and "O" when the smaller component is O in the above item 2, and the output Y2 thereof is calculated on the basis of the input thereof.
5) The smaller one of the components obtained in the above items 1 and 2 is obtained. The IIR filter inputs "O" when the smaller component is the component obtained in the above item 1 and "1" when the smaller component is the component obtained in the above item 2, and the output Y3 thereof is calculated on the basis of the input thereof.
6) The interpolation value using the diagonal component in the above item 3 can be calculated as follows:

$$I_D = Y1(a+f)/2 + (1-Y1) \times [(c+d)/2]$$

7) The interpolation value using the diagonal component in the above item 3 can be calculated as follows:

$$I_{MD} = Y2(b+e)/2 + (1-Y2) \times (x+z)/2$$

8) Using the control signal Y3 obtained in the above item 5 and $I_D$ and $I_{MD}$ obtained in the above items 6 and 7, the final interpolation value can be obtained as follows:

$$I = Y3 \times I_{MD} + (1-Y3) \times [(x+z)/2]$$

9) Using the control signal Y3 obtained in the above item 5 and $I_D$ and $I_{MD}$ obtained in the items 6 and 7, the final interpolation value can be obtained as follows:

$$I = Y3 \times I_{MD} + (1-Y3) \times I_D$$

A point of difference between the three dimensional region scanning line interpolation methods in accordance with the second and third embodiments of the present invention is that the method of the second embodiment can provide a more sharp video signal as compared with the method of the third embodiment and the probability of the interpolation error in the method of the third embodiment is lower than that in the second embodiment.

In FIG. 9, "DCI" represents the diagonal interpolation signal using the diagonal components and "HVI" represents the vertical/horizontal interpolation signal using the vertical and horizontal components. These signals DCI and HVI are obtained by the multiplication by the weight from the IIR filter as mentioned above, which maintains a consistency. Also, the final interpolation signal Vout is obtained by the multiplication by the weight from the IIR filter as mentioned above, which is varied according to a correlation between the interpolation signal components DCI and HVI. Each of the K1, K2 and K3 values of the K amplifiers in the IIR filters 341, 361 and 371 used in FIG. 9 is selected as one of 0.5, 0.25 and 0.75.

In operation, upon receiving the video signal Vin of the TV signal, the variation detecting circuit 310 detects the first diagonal sum signal DCA1, the second diagonal sum signal DCA2, the vertical sum signal VCA, the first diagonal difference signal, the second diagonal difference signal and the vertical difference signal of the received video signal. Also, the horizontal variation detecting circuit 320 detects the horizontal sum signal HCA and the horizontal difference signal of the received video signal. The vertical/horizontal difference selecting circuit 330 selects a smaller one of the horizontal difference signal from the horizontal variation detecting circuit 320 and the vertical difference signal from the variation detecting circuit 310 and the control signal generating circuit 350 selects a smaller one of the first diagonal difference signal and the second diagonal difference signal from the variation detecting circuit 310 and compares the smaller one of the horizontal difference signal and the vertical difference signal with the smaller one of the first and second diagonal difference signals. Generated in accordance with the compared results are the control signals from the control signal generating circuit 350.

At this time, in the vertical/horizontal interpolation signal generating circuit 340, the IIR filter 341 inputs "1" when the vertical difference signal is smaller than the horizontal difference signal and "O" when the vertical difference signal is larger than the horizontal difference signal, and outputs a weight based on the input. The weight from the IIR filter 341 is multiplied by the vertical component average VCA1 in a multiplier 343. Also, a complement to the weight from the IIR filter 341 or "1—weight" is obtained by an adder 344 and then multiplied by the horizontal component average HCA1 from a ½ amplifier 345 in a multiplier 346. Then, the output signals from the multipliers 343 and 346 are added by an adder 347, which then outputs the added signal as the vertical/horizontal interpolation signal HVI.

Also in the control signal generating circuit 350, a comparator 353 compares absolute values of the first and second diagonal difference signals from the variation detecting circuit 310 to each other. When the first diagonal difference signal is judged smaller than the second diagonal difference signal as a results of the comparison, the IIR filter 361 in the diagonal interpolation signal generating circuit 360 inputs "1". When the first diagonal difference signal is larger than the second diagonal difference signal as a result of the comparison, the IIR filter 361 in the diagonal interpolation signal generating circuit 360 inputs "O". As a result, the IIR filter 361 outputs a weight based on the input. A complement to the weight from the IIR filter 361 is obtained and then multiplied by the average of the first diagonal sum signal. Also, the weight from the IIR filter 361 is multiplied by the average of the second diagonal sum signal. Then, the multiplied values are added. In result, the added signal is outputted as the diagonal interpolation signal.

Also in the interpolation signal output circuit 370, the IIR filter 371 inputs "1" when a smaller one (HVS) of the absolute values of the vertical and horizontal difference signals is smaller than a smaller one (DCS) of the absolute values of the first and second diagonal difference signals. Also, the IIR filter 371 inputs "O" when the smaller one (HVS) of the absolute values of the vertical and horizontal difference signals is larger than the smaller one (DCS) of the absolute values of the first and second diagonal difference signals. As a result, the IIR filter 371 outputs a weight based on the input. A complement to the weight from the IIR filter 371 is obtained and then multiplied at the multiplier 364 by the output signal (DCI) from the diagonal interpolation signal generating circuit 360. Also, the weight from the IIR filter 371 is multiplied at the multiplier 363 by the vertical/ horizontal interpolation signal HVI from the vertical/ horizontal interpolation signal generating circuit 340. Then, the multiplied values from multipliers 363 and 364 are added in an adder 365. In result, the added signal is outputted as the final interpolation signal.

As hereinbefore described, according to the present invention, there are provided the method and apparatus for interpolating the scanning line of the TV signal in the TV, wherein the diagonal component of the video signal of the TV signal is considered and there can be prevented the considerable picture quality degradation such as the line structure, the line flicker and the vertical resolution insufficiency due to shortage in the number of the scanning lines, which may be present in the conventional intra-field and inter-field interpolation methods and the conventional motion adaptive interpolation method. In particularly, such a considerable picture quality degradation can be prevented by the maintenance of a consistency for the control signal according to the present invention. Also, the horizontal and diagonal components of the video signal are considered for coping with even the horizontal and diagonal variations of the video. Moreover, although the one frame memory has been used for discrimination of the video motion in the conventional motion adaptive interpolation method, the one field memory is used in the present method, resulting in a reduction in the hardware cost. A subjective picture quality of the whole of the video can become good with only the process on the two dimensional region. Furthermore, an enhancement level can be adjusted automatically in an enhancement process of the signal interpolated based on the weight with the consistency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of interpolating a scanning line of a video signal, comprising the steps of:

obtaining an interpolation signal by:

discriminating at least vertical and diagonal variations from among possible vertical, horizontal and diagonal variations of an input video signal for obtaining at least vertical and diagonal signal components therefrom;

determining from among said obtained signal components a signal component having the smallest variation, and generating a weight in accordance with said determination wherein said weight is determined by IIR-filtering a weight control signal generated in accordance with said determination;

multiplying an averaged value of said vertical component signal by said weight and multiplying an averaged value of said signal component determined as having the smallest variation by a complement of the weight; and adding the multiplied signals for thereby obtaining the sum as an interpolation signal;

compressing a time base of the interpolation signal and a time base of the input video signal, respectively; and scanning selectively and in turn the time base-compressed input video signal and the time base-compressed interpolation signal in the unit of a line.

2. The method of interpolating a scanning line of a video signal as set forth in claim 1, wherein said discriminating step further comprises the steps of:

obtaining from the input video signal a first diagonal sum signal, a second diagonal sum signal, a vertical sum signal, a first diagonal difference signal, a second diagonal difference signal and a vertical difference signal with respect to a pixel of the input video signal to be interpolated;

comparing the first and second diagonal difference signals with the vertical difference signal and generating control signals in accordance with said comparison;

forming an average of the first diagonal sum signal, forming an average of the second diagonal sum signal, forming an average of the averages of the first and second diagonal sum signals, and forming an average of the vertical sum signal; and selecting the smallest respective one among the average of the first diagonal sum signal, the average of the second diagonal sum signal, the average of the averages of the first and second diagonal sum signals and the average of the vertical sum signal, in response to said control signals to form a smallest sum signal as a signal component having the smallest variation;

wherein said weight control signal is generated in response to said control signals.

3. The method of interpolating a scanning line of a video signal as set forth in claim 1, wherein said step of obtaining the interpolation signal further comprises the steps of:

obtaining from a current field of the input video signal a first diagonal sum signal, a second diagonal sum signal, a vertical sum signal, a first diagonal difference signal, a second diagonal difference signal and a vertical difference signal with respect to a pixel of the input video signal to be interpolated;

obtaining from a preceding field of the input video signal a horizontal sum signal by adding an interpolation pixel of the previous field to left and right pixels of the preceding field being pixels respectively displaced to the left and right with respect to the interpolation pixel of the preceding field, and obtaining a horizontal difference signal resulting from a difference between the left and right pixels;

comparing an absolute value of the horizontal difference signal with an absolute value of the vertical difference signal and generating a first comparison signal in accordance with said comparing operation to select a smaller one of the compared signals;

comparing an absolute value of the first diagonal difference signal with an absolute value of the second diagonal difference signal and generating a second comparison signal in accordance with said comparing operation for selecting a smaller one of the two signals, and comparing the selected smaller one of the absolute values of the horizontal and vertical difference signals with the selected smaller one of the absolute values of the first and second diagonal difference signals and generating a control signal in accordance with said comparing operation;

determining the weight in response to the second comparison signal and the control signal;

obtaining a smallest sum select control signal in response to the first comparison signal, the second comparison signal and the control signal;

forming an average of the first diagonal sum signal, forming an average of the second diagonal sum signal, forming an average of the horizontal sum signal and forming an average of the vertical sum signal; and selecting the smallest one among the average of the first diagonal sum signal, the average of the second diagonal sum signal, the average of the horizontal sum signal and the average of the vertical sum signal, respectively, in response to the smallest sum select control signal and the control signal.

4. The method of interpolating a scanning line of a video signal as set forth in claim 1, wherein, in said step of obtaining the interpolation signal, a horizontal/vertical interpolation and a diagonal interpolation are intermediately performed according to respectively determined weights and a final interpolation is then performed upon resultant signals of said horizontal/vertical interpolation and said diagonal interpolation in accordance with a further determined weight, said step of obtaining the interpolation signal further comprising:

obtaining from a current field of the input video signal a first diagonal sum signal, a second diagonal sum signal, a vertical sum signal, a first diagonal difference signal, a second diagonal difference signal and a vertical difference signal with respect to a pixel to be interpolated;

obtaining from a preceding field of the input video signal a horizontal sum signal by adding an interpolation pixel of the preceding field to left and right pixels of the previous field being pixels respectively displaced to the left and right with respect to the interpolation pixel of the preceding field, and obtaining a horizontal difference signal resulting from a difference between the left and right pixels;

comparing an absolute value of the horizontal difference signal with an absolute value of the vertical difference signal and generating a first comparison signal to select a smaller one of the two signals as a horizontal/vertical difference signal in accordance with said comparison;

determining a first weight in accordance with the first comparison signal, and generating a complement of the first weight;

forming an average of the vertical sum signal;

forming an average of the horizontal sum signal;

multiplying the average of the vertical sum signal by the first weight and multiplying the average of the horizontal sum signal by the complement to the first weight, and obtaining the sum of the thusly multiplied signals as a vertical/horizontal interpolation signal;

comparing an absolute value of the first diagonal difference signal with an absolute value of the second diagonal difference signal and generating a second comparison signal in accordance with said comparing operation to select a smaller one of said two signals, and comparing the horizontal/vertical difference signal with the selected smaller one of the first and second diagonal difference signals and generating a control signal in accordance with said comparison;

determining a second weight in response to the second comparison signal, and generating a complement of the second weight;

forming an average of the first diagonal sum signal;

forming an average of the second diagonal sum signal;

multiplying the average of the first diagonal sum signal by the second weight, multiplying the average of the second diagonal sum signal by the complement to the second weight, and adding the thusly multiplied signals to form a diagonal interpolation signal;

determining a third weight in response to the control signal, and generating a complement of the third weight; and multiplying the diagonal interpolation signal by the third weight, multiplying the vertical/horizontal interpolation signal by the complement to the third weight, and obtaining the sum of the thusly multiplied signals as the interpolation signal.

5. An apparatus for interpolating a scanning line of a video signal, comprising:

scanning line interpolating means for discriminating at least vertical and diagonal variations from among possible vertical, horizontal and diagonal variations of an input video signal for obtaining at least vertical and diagonal component signals therefrom, for comparing said discriminated variations for determining among said component signals a component signal having a smallest variation and generating at least one weight control signal in accordance with said comparison, for IIR-filtering said weight control signal and generating at least one weight in accordance therewith and for generating a complement of said weight, for multiplying an averaged value of one of said component signals by said weight and multiplying an averaged value of the one of said component signals determined as having the smallest variation by the complement to said weight, and for adding the multiplied signals and outputting the sum as an interpolation signal;

first time base compressing means for compressing a time base of said interpolation signal;

second time base compressing means for compressing a time base of said input video signal; and means for selecting said time base-compressed input video signal with respect to a scanning line of said input video signal and for selecting said time base-compressed interpolation signal with respect to a scanning line to be interpolated.

6. The apparatus for interpolating a scanning line of a video signal according to claim 5, wherein said scanning line interpolating means further comprises:

variation detecting means for obtaining, as said component signals from said input video signal, a first diagonal sum signal, a second diagonal sum signal, a vertical sum signal, a first diagonal difference signal, a second diagonal difference signal and a vertical difference signal;

control signal generating means for comparing an absolute value of the first diagonal difference signal with an absolute value of the vertical difference signal, for comparing an absolute value of the second diagonal difference signal with the absolute value of the vertical difference signal, and for generating control signals in accordance with the results of said comparing operations;

smallest difference signal selecting means for averaging the first diagonal sum signal, for averaging the second diagonal sum signal, for averaging the vertical sum signal, and for averaging the averages of the first and second diagonal sum signals, and for selecting a smallest one of said averaged signals in accordance with said control signals from said control signal generating means;

IIR filter means for receiving a logical combination of said control signals from said control signal generating means as said weighing control signal and for generating said weight in accordance therewith; and interpolation signal output means for multiplying the averaged vertical sum signal by the weight generated from the IIR filter means, for generating the complement of the weight and multiplying the selected smallest one of said averaged signals by said complement, and for adding the thusly multiplied signals and outputting the sum as the interpolation signal.

7. The apparatus for interpolating a scanning line of a video signal according to claim 6, wherein said IIR filter means comprises:
   subtractor means for obtaining a difference between said input weighing control signal and a one sample-delayed output signal of said IIR filter means;
   amplifier means for amplifying an output signal from said subtractor means by a predetermined value;
   adder means for adding an output signal from said amplifier means with the one sample-delayed output signal of said IIR filter means and outputting said added signal as said weight; and
   one sample delay means for delaying said added signal from said adder means by one sample period and feeding back the one sample-delayed signal to said subtractor means and said adder means.

8. The apparatus for interpolating a scanning line of a video signal according to claim 6, wherein said variation detecting means comprises:
   first diagonal component detector means for delaying the input video signal by two sample periods and for also delaying the input video signal by one line period, for adding the two-sample-delayed video signal to the one-line-delayed video signal to obtain the first diagonal sum signal, and for subtracting the one-line-delayed video signal from the two-sample-delayed video signal to obtain the first diagonal difference signal;
   vertical component detector means for delaying the input video signal by one line period plus one sample period and for also delaying the input video signal by one line period, for adding the one-sample-delayed video signal to the one-line-plus-one-sample-delayed video signal to obtain the vertical sum signal, and for subtracting the one-line-plus-one-sample-delayed video signal from the one-sample-delayed video signal to obtain the vertical difference signal; and
   second diagonal component detector means for delaying the input video signal by two sample periods and for also delaying the input video signal by one line period plus two sample periods, for adding the two-sample-delayed video signal to the input video signal to obtain the second diagonal sum signal, and for subtracting the one-line-plus-two-sample-delayed video signal from the input video signal to obtain the second diagonal difference signal.

9. The apparatus for interpolating a scanning line of a video signal according to claim 5, wherein said scanning line interpolating means comprises:
   variation detecting means for obtaining from a current field of said input video signal a first diagonal sum signal, a second diagonal sum signal, a vertical sum signal, a first diagonal difference signal, a second diagonal difference signal and a vertical difference signal;
   horizontal variation detecting means for obtaining from a preceding field of said input video signal a horizontal sum signal by adding an interpolation pixel of the preceding field of said input video signal to left and right pixels being pixels displaced respectively to the left and right of the interpolation pixel, and for obtaining a horizontal difference signal corresponding to the difference between said left and right pixels;
   vertical/horizontal difference selecting means for comparing an absolute value of the horizontal difference signal with an absolute value of the vertical difference signal and generating a first comparison signal in accordance with said comparing operation, and for selecting a smaller one of said absolute values as a horizontal/vertical difference signal in accordance with said first comparison signal;
   first control signal generating means for comparing an absolute value of the first diagonal difference signal with an absolute value of the second diagonal difference signal and generating a second comparison signal in accordance with said comparing operation, for selecting a smaller one of the absolute values of the first diagonal difference signal and the second diagonal difference signal in accordance with said second comparison signal, and for further comparing the selected smaller one of said absolute values with the horizontal/vertical difference signal for generating a first control signal in accordance with said further comparing operation;
   weight generating means including an IIR filter, for generating the weight control signal input to said IIR filter in response to the second comparison signal and the first control signal, for generating said weight as an output signal of said IIR filter in accordance therewith;
   second control signal generating means for generating a select control signal in response to the first comparison signal from the vertical/horizontal difference selecting means and the second comparison signal and first control signal from the first control signal generating means;
   smallest difference signal selecting means for averaging the first diagonal sum signal, for averaging the second diagonal sum signal, for averaging the vertical sum signal, and for averaging the horizontal sum signal, and for selecting a smallest one of said averaged signals in accordance with the select control signal from said second control signal generating means; and
   interpolation signal output means for multiplying the averaged vertical sum signal by the weight from the weight generating means, for generating the complement of the weight and multiplying the selected smallest one of said averaged signals by said complement, and for adding the thusly multiplied signals and outputting their sum as the interpolation signal.

10. The apparatus for interpolating a scanning line of a video signal according to claim 5, wherein said scanning line interpolating means comprises:
    variation detecting means for obtaining from a current field of said input video signal a first diagonal sum signal, a second diagonal sum signal, a vertical sum signal, a first diagonal difference signal, a second diagonal difference signal and a vertical difference signal;
    horizontal variation detecting means for obtaining from a preceding field of said input video signal a horizontal sum signal by adding an interpolation pixel of the preceding field of said input video signal to left and right pixels being pixels displaced respectively to the left and right of the interpolation pixel, and for obtaining a horizontal difference signal corresponding to a difference between said left and right pixels;
    vertical/horizontal difference selecting means for comparing an absolute value of the horizontal difference signal with an absolute value of the vertical difference signal and generating a first comparison signal in accordance with said comparing operation, and for selecting a smaller one of said absolute values of the horizontal difference signal and the vertical difference signal as a vertical/horizontal difference signal in accordance with said first comparison signal;

vertical/horizontal interpolation signal generating means for generating a first weight by IIR-filtering said first comparison signal, for averaging the vertical sum signal and multiplying the averaged vertical sum signal by the first weight, for averaging the horizontal sum signal, generating a complement of the first weight and multiplying the averaged horizontal sum signal by the complement of the first weight, and for adding the thusly multiplied signals and outputting the sum as a vertical/horizontal interpolation signal;

control signal generating means for comparing an absolute value of the first diagonal difference signal with an absolute value of the second diagonal difference signal and generating a second comparison signal in accordance with said comparing operation, for selecting a smaller one of the absolute values of the first diagonal difference signal and the second diagonal difference signal in accordance with said second comparison signal, and for further comparing the selected smaller one of said absolute values with the horizontal/vertical difference signal for generating a control signal in accordance with said further comparing operation;

diagonal interpolation signal generating means for generating a second weight by IIR-filtering said second comparison signal, for averaging the first diagonal sum signal and multiplying the averaged first diagonal sum signal by the second weight, for averaging the second diagonal sum signal, generating a complement of the second weight and multiplying the averaged second diagonal sum signal by the complement of the second weight, and for adding the thusly multiplied signals and outputting the sum as a diagonal interpolation signal; and interpolation signal output means for generating a third weight by IIR-filtering said control signal, for multiplying the vertical/horizontal interpolation signal by said third weight, for generating a complement of said third weight and multiplying the diagonal interpolation signal by the complement of the third weight, and for adding the thusly multiplied signals and outputting the sum as the interpolation signal.

* * * * *